US 6,839,806 B2

(12) United States Patent
Murakami et al.

(10) Patent No.: US 6,839,806 B2
(45) Date of Patent: Jan. 4, 2005

(54) CACHE SYSTEM WITH A CACHE TAG MEMORY AND A CACHE TAG BUFFER

(75) Inventors: Yoshiki Murakami, Hadano (JP); Masaru Koyanagi, Hadano (JP); Hideya Akashi, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 09/941,696

(22) Filed: Aug. 30, 2001

(65) Prior Publication Data

US 2002/0042860 A1 Apr. 11, 2002

(30) Foreign Application Priority Data

Oct. 5, 2000 (JP) ........................................ 2000-305862

(51) Int. Cl.[7] ............................................. G06F 12/00
(52) U.S. Cl. ...................... 711/118; 711/120; 711/144; 711/145; 711/141; 711/156; 711/168
(58) Field of Search ................................ 711/144, 145, 711/143, 141, 156, 120, 118, 146, 168

(56) References Cited

U.S. PATENT DOCUMENTS

| 5,619,673 | A | * | 4/1997 | Wang | 711/207 |
| 5,978,886 | A | * | 11/1999 | Moncton et al. | 711/118 |
| 6,026,476 | A | * | 2/2000 | Rosen | 711/206 |
| 6,226,763 | B1 | * | 5/2001 | Fu et al. | 714/53 |
| 6,266,752 | B1 | * | 7/2001 | Witt et al. | 711/200 |
| 6,401,175 | B1 | * | 6/2002 | Tremblay et al. | 711/147 |
| 6,412,059 | B1 | * | 6/2002 | Matsuyama | 711/204 |
| 6,636,906 | B1 | * | 10/2003 | Sharma et al. | 710/22 |
| 2004/0044848 | A1 | * | 3/2004 | Katayama | 711/125 |

FOREIGN PATENT DOCUMENTS

JP          A 9-293060          11/1997

* cited by examiner

Primary Examiner—Hong Kim
(74) Attorney, Agent, or Firm—Antonelli, Terry, Stout & Kraus, LLP

(57) ABSTRACT

A cache system comprising a cache tag buffer 270 for storing a part of a cache tag memory 260. When a memory processing request is issued from a processor 10, a cache control means 280 retrieves both of the cache tag memory 260 and the cache tag buffer 270. If a target cache block is present in the cache tag buffer 270, then, without waiting for a retrieval result of the cache tag memory 260, the cache control circuit 280 accesses the cache data memory 250 using information of the cache block.

23 Claims, 3 Drawing Sheets

260 CACHE TAG MEMORY

270 CACHE TAG BUFFER

CACHE SYSTEM WITH A CACHE TAG MEMORY AND A CACHE TAG BUFFER

BACKGROUND OF THE INVENTION

The present invention relates to a computer system having a cache memory and in particular to a cache system appropriate for increasing the access speed to the cache memory.

Recently, as the processor operation frequency is increased, the ratio of the memory access latency against the processing time of a computer system as a whole is significantly increased. As a conventional method to reduce the memory access latency, a cache memory has been provided. The most ordinary cache memory includes a cache tag memory containing a tag and a valid bit added to the tag and a cache data memory having part of data of a memory-in-memory. The cache tag memory as one of the cache memory components stores information (tag) indication a data position in a memory belonging to the cache data memory so that the information is used to make a cache hit decision. At present, the LSI integration is increased and the cost required for production is reduced. Accordingly, the cache memory capacity in a computer system has been increased, which in turn is increasing the cache tag memory.

Increase of the cache tag memory capacity affect the cache access latency. If the cache tag memory capacity excess the size that can be mounted in an LSI, then the cache tag memory should be arranged outside the LSI. This increases the cache access latency due to an LSI external delay. Thus, it is necessary to reduce the access latency for the cache tag memory, thereby increasing the performance of a computer system.

For example, Japanese Patent Publication 9-293060 discloses a technique for effectively performing an access to a cache tag memory in a computer system to improve the performance. In this conventional technique, a plurality of processors share a main memory via a cache system to constitute a multi-processor system. Each of the cache systems has an address history issued from another cache system. If an address reported from anther cache system is contained in the address history, an unnecessary access to the cache tag memory is suppressed by a coherency transaction history control circuit. This facilitates the cache memory state decision processing for cache coherency control.

In general, a cache tag memory performs cache coherency control through management of four cache block states (MESI algorithm): Modified, Exclusive, Shared, and Invalid. The "Invalid" state (I) indicates that the cache block contains no valid data. The "Shared" (S) state indicates that the cache block contains data (clean data) identical to that in the main memory and this data is also present in another cache (shared). The "Exclusive" (E) state indicates that the cache block contains data (clean data) identical to that contained in the main memory and that this data is not present in the other caches. The "Modified" state (M) indicates that the cache block contains data (dirty data) which may differs from the main memory and that the data is not present in the other caches. That is, when data is written into a cache block, the data is handled as dirty data which may be different from the main memory.

In the aforementioned conventional technique, an access to a cache tag memory is suppressed if the state is "Shared" or "Invalid". Accordingly, for example, when processing a task requiring frequent writing, each write updates the cache block state to "Modified", which results in frequent access to the cache tag memory. Here, the access latency to the cache tag memory is a problem that cannot be ignored when considering the computer system performance. In the aforementioned conventional technique, access frequency to the cache tag memory when performing a transaction processing is determined by that upon a cache hit, one read process and one write process to the cache tag memory are required. Moreover, upon a cache miss, two read process and two write processes to the cache memory are required.

Thus, the conventional technique requires a large capacity of the cache tag memory and the cache tag memory is mounted outside an LSI having a cache control circuit and the like. When the access latency to the cache tag memory is increased, the latency required for a transaction processing of a computer system in increased.

SUMMARY OF THE INVENTION

It is therefore an object of the present invention to provide a cache system in which access latency to a cache tag memory is reduced, thereby further improving performance of a computer system.

According to this invention, a cache inverter is provided in an LSI having a cache control circuit. This enables to retain a state of a cache block to be subjected to a transaction processing in a cache tag memory until the transaction processing is completed in a computer system. Thus, the transaction processing can perform a processing to the cache tag memory only by read out information of corresponding cache block information from the cache tag memory and accessing a cache tag buffer in the LSI having the cache control circuit. Accordingly, it is possible to minimize the access latency to the cache tag buffer, thereby reducing the latency required for a transaction processing by the computer system.

Moreover, the cache tag buffer has in addition to a cache block state bit (MESI), a dirty bit indicating whether the cache block has been modified and a lock bit indicating whether the transaction using the cache block is present in the computer system. These bits are used when writing back the cache block state present in the cache tag buffer to the cache tag memory. More specifically, if a cache block with the lock bit indicating that no transaction is currently using the cache block and the dirty bit indicating that the cache block state has been modified exists, then the cache block is written back to the cache tag memory. If the bit state is other than this, no write back is performed. That is, the lock bit monitored all the time and a cache block not used in the cache tag buffer exists, this is written back to the cache tag memory, thereby enabling to effectively utilize the cache tag buffer. Moreover, by checking the dirty bit, it is possible to prevent an unnecessary write back to the cache tag memory, thereby effectively accessing the cache tag memory.

As has been described above, according to the present invention, by providing a cache tag buffer for storing part of a cache tag memory, it is possible to reduce the number of times access is made to the cache tag memory, thereby reducing the cache access latency in a computer system.

DETAILED DESCRIPTION OF EMBODIMENTS

Description will now be directed to embodiments of the present invention with reference to the attached drawings.

Figure 1:
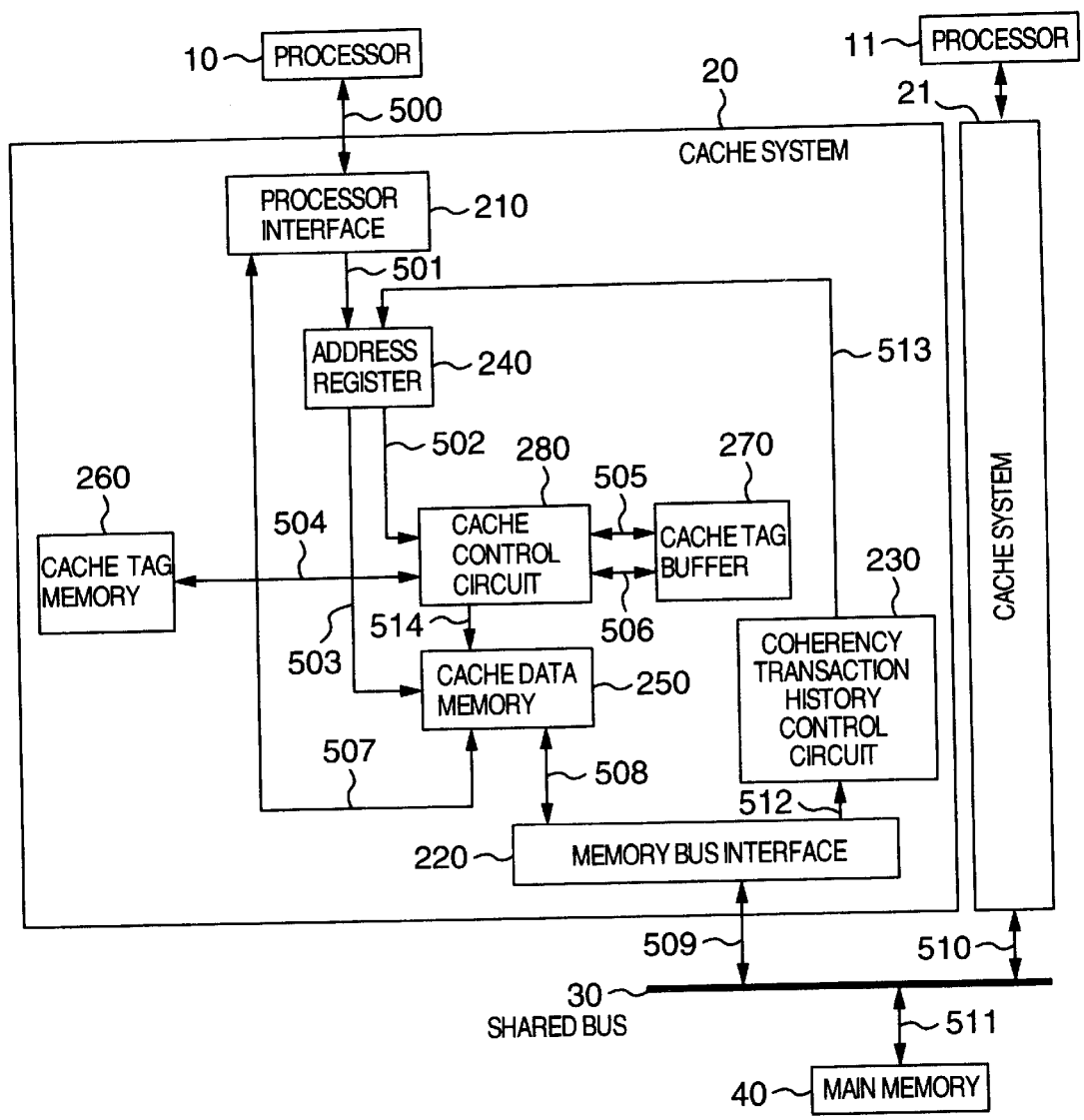
FIG. 1 shows configuration of a computer system according to an embodiment of the present invention.

FIG. 1 shows a configuration of a computer system according to an embodiment of the present invention. In FIG. 1, the computer system includes processors 10 and 11, cache systems 20 and 21, a shared bus 30, and a main memory 40. The cache system 20 has: a processor interface 210 for connecting the processor 10 to the cache system 20; a memory bus interface 220 for connecting the shared bus 30 to the cache system 20; a coherency transaction history control circuit 230; an address register 240 for loading an address transferred from the processor interface 210 or the coherency transaction history control circuit 230; a cache data memory 250 for storing cache data; a cache tag memory 260 for storing an address of the cache data stored in the cache data memory 250 and four states used for cache coherency control, i.e., Modified, Shared, Exclusive, and Invalid; a cache tag buffer 270 for storing part of the cache tag memory 260 which is a main feature of the present invention, and a cache control circuit 280 for controlling circuits in the cache system 20.

The cache tag buffer 270 is arranged in an LSI having the cache control circuit 280 and other circuits except for the cache tag memory 260. The cache tag memory 260 is mounted outside the LSI if it is of a large size. There is a case that the cache data memory is also mounted outside the LSI.

In FIG. 1, though detailed configuration of the cache system 21 is omitted, the cache system 21 has configuration identical to that of the cache system 20. Moreover, in FIG. 1, two processors and two cache systems constitute a multi-processor system but it is also possible to constitute the multi-processor system using three or more processors and cache systems.

Figure 2A:
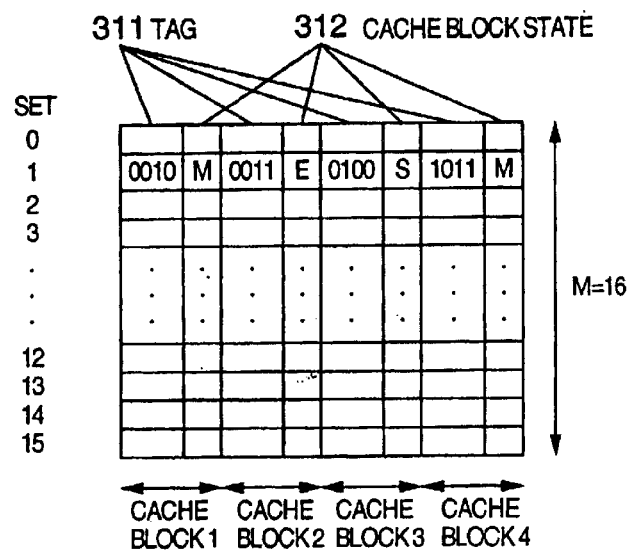
FIG. 2A shows a configuration examples of a cache tag memory and FIG. 2B shows a configuration example of a cache tag buffer.
Figure 2B:
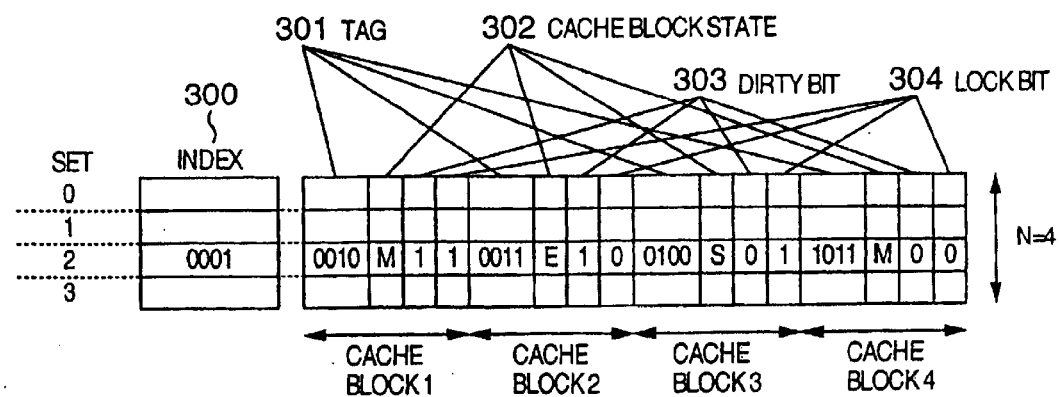

FIG. 2A shows a configuration example of the cache tag memory 260 and FIG. 2B shows a configuration example of the cache tag buffer 270 which is a main feature of the present invention. Here, the cache tag memory 260 has a 4-way-set-associative configuration in which the set count M is 16. The cache tag buffer 270 maintains part of the cache tag memory 260 and has cache configuration identical to that of the cache tag memory 260, i.e., 4-way-set-associative configuration, but the set count N is 4. That is, in general, M≧N. In FIG. 2A and FIG. 2B, since both of the cache tag memory 260 and the cache tag buffer 270 have the 4-way-set-associative configuration, each set has information of four cache blocks: 1, 2, 3, and 4.

The cache tag memory 260 is composed of: a tag block 311 for storing addresses (tags) of cache data stored in the cache block of the set of the cache data memory 250 for each of the cache blocks of the sets; and a cache block state 312 indicating in which of the four states state, i.e., M, E, S, I, the cache block is. M, E, S, and I represent Modified, Exclusive, Shared, and Invalid, respectively.

The cache tag buffer 270 is composed of: an index block 300 for storing an address (hereinafter, referred to as an index address) corresponding to a set number of the cache tag memory 260 for each set; a tag block 301 for storing a tag in the cache tag memory 260 for each of the cache blocks; a cache block state block 302 for retaining a cache block state of the cache tag memory 260; a dirty bit 303 indicating presence/absence of state updating of the cache block; and a lock bit 304 indicating presence of a transaction using the cache block. The dirty bit 303, if "1", indicates that the corresponding cache block state has been updated and, if "0", that the state has not been updated. Moreover, the lock bit 304, if "1", indicates that a transaction using the cache block is present, and if "0", indicates that no transaction is using the cache block.

To decide whether a cache block in the cache tag buffer 270 is valid or invalid, the cache block state block 302 is used. More specifically, in case of "I", it is decided that the cache block is invalid and in case other than "I", it is decided that the cache block is valid. Moreover, a write process to the cache tag buffer 270 is performed on a set basis. Accordingly, when a set of the cache tag memory 260 is loaded in the cache tag buffer 270 by a transaction process for one cache block within a set, those transactions for the other cache blocks within the set can also reduce the cache access latency.

Hereinafter, referring to FIG. 1, FIG. 2A, and FIG. 2B, explanation will be given on operation of the cache system 20 in a transaction process using the cache tag buffer 270 which is the main feature of the present invention.

In the computer system shown in FIG. 1, when a read transaction or a write transaction to the main memory is issued from the processor 10, the cache system 20 receives the transaction in the processor interface 210 via the bus 500. Next, the cache system 20, via a path 501 loads the memory address (hereinafter, referred to as a request address) to be subject to the transaction process. The request address loaded in the address register 240 is transmitted via a path 502 and a path 503 to the cache control circuit 280 and to the cache data memory 250. The cache control circuit 280, using the request address, reads out the content of the cache tag memory 260 via a path 204 and the content of the cache tag buffer 270 via a path 505, and decides whether the a cache block corresponding to the request address is present in the cache tag memory 260 or in the cache tag buffer 270. Here, if the cache tag memory 260 contains the cache block specified by the request address and the cache tag buffer 270 has no cache block specified by the request address (initial state in a transaction), then the cache control circuit 280 writes all the index address of the set of the cache tag memory 260 and all the tags in the set as well as all the states of the cache blocks corresponding to the tags in the set, into the cache tag buffer 270 via a path 506. After writing cache block information into the cache tag buffer 270, the transaction to process a cache block in the set updates the cache block information stored in the cache buffer 270, thereby performing a cache access and cache coherency control. Other cases will be explained later together with detailed operation of the cache control circuit 280 to the cache tag buffer 270.

If the cache tag memory 260 or the cache tag buffer 270 contains a tag corresponding to the request address, the cache control circuit 280 decides a state of the cache block accompanying the tag. If the cache block state decision results in a cache hit as valid, then the cache control circuit 280 transmits information which has caused the cache hit, to the cache data memory 250 via a path 514. Upon reception of the cache hit information, the cache data memory 250 outputs data of the corresponding cache block to the processor interface 210 via a path 507. The processor interface 210 transmits the received data to the processor 10 via the path 500. Moreover, if upon a cache hit, the transaction is a write transaction and if the cache block state of the tag corresponding to the request address is Exclusive, then the cache control circuit 280 updates the cache block state to "Modified via a path 506. In case of a state other than Exclusive, for example, if Shared, then the cache block state is not updated.

On the other hand no tag corresponding to the request address is contained in the cache tag memory 260 or in the cache tag buffer 270, causing a cache miss, then the cache control circuit 280 transmits the cache miss information to the memory bus interface 220 via a path 508. Upon reception of the cache miss information, the memory path interface 220 issues a read-out transaction or a write-in transaction to the shared bus 30 via a path 509. The read-out or the write-in transaction is transferred via the shared bus and a path 510 to the cache system 21 and via a path 511 to the main memory 40. Cache coherency processing for a transaction from the other cache system is identical in the cache systems 20 and 21 and here, as an example, processing in the cache system 20 will be explained.

The cache system snoops the transaction from the cache system 21 flowing in the shared bus 30, thereby checking the cache block state of itself. More specifically, the memory bus interface 220 fetches, via the path 509, a transaction of the cache system 21 flowing in the shared bus 30. After this, the memory bus interface 220 transmits the transaction fetched via the path 512, to the coherent transaction history control circuit 230. The coherent transaction history control circuit 230 has a history of an address (hereinafter, referred to as a coherency address) to be processed by a transaction issued from the other cache system 21 and if a coherency address of the fetched transaction is not contained, the coherent transaction history control circuit 230 loads the coherency address of the transaction in the address register 240 via a path 513. It should be noted that the processing in the coherency transaction history control circuit 230 is detailed in the aforementioned JP-A-9-293060 and its explanation is omitted here.

The coherency address loaded in the address register 240 is transmitted to the cache control circuit 280 and the cache data memory 250 via the path 502 and the path 503, respectively. Using the coherency address, the cache control circuit 280 reads out a content of the cache tag memory 260 via the path 504 and a content of the cache tag buffer 270 via the path 505. Here, if the cache tag memory 260 contains a cache block corresponding to the coherency address and if the cache tag buffer 270 has no corresponding cache block, the cache control circuit 280 writes into the cache tag buffer 270 via the path 506, the index address of the set of the cache tag memory 260 and all the tags in the set as well as all the cache block states corresponding to the tags in the set. After writing the cache block information into the cache tag buffer 270, a transaction to process a cache block in the set updates the cache block information present in the cache tag buffer 270, thereby performing cache coherency control.

In case the cache block corresponding to the coherency address is present in the cache tag memory 260 or in the cache tag buffer 270, the cache control circuit 280 decides the cache block state accompanying the tag. If the cache block state results in a cache hit as valid, then the cache control circuit 280 transmits the information which has caused the cache hit, to the cache data memory 250 via the path 514. Moreover, in case of the cache hit, during write to the cache tag buffer 270, a read-in transaction writes "Shared" and a write-in transaction writes "Invalid" into the cache block state. If a cache hit has occurred and if the cache block state is Modified, the latest data exists in the cache system 20 accordingly, the cache data memory 250 transmits via the path 508 data of the corresponding cache block to the memory bus interface 220. The memory bus interface 220 returns data of the cache block to the cache system 21 via the shared bus 30.

When the cache system has received the latest data from the main memory 40 or the cache system 21, a transaction processing is performed as follows. The memory bus interface 220 which has received the latest data transmits the latest data to the processor 10 via the processor interface 210 and simultaneously with this, writes the latest data into the cache data memory 250. Moreover, the information that the latest data has arrived at the cache system 20 is transmitted via the coherency transaction history control circuit 230 and the address register 240 to the cache control circuit 280 via the address register 240. Upon reception of the information, the cache control circuit 280 updates the cache block state of the cache tag buffer 270.

Figure 3:
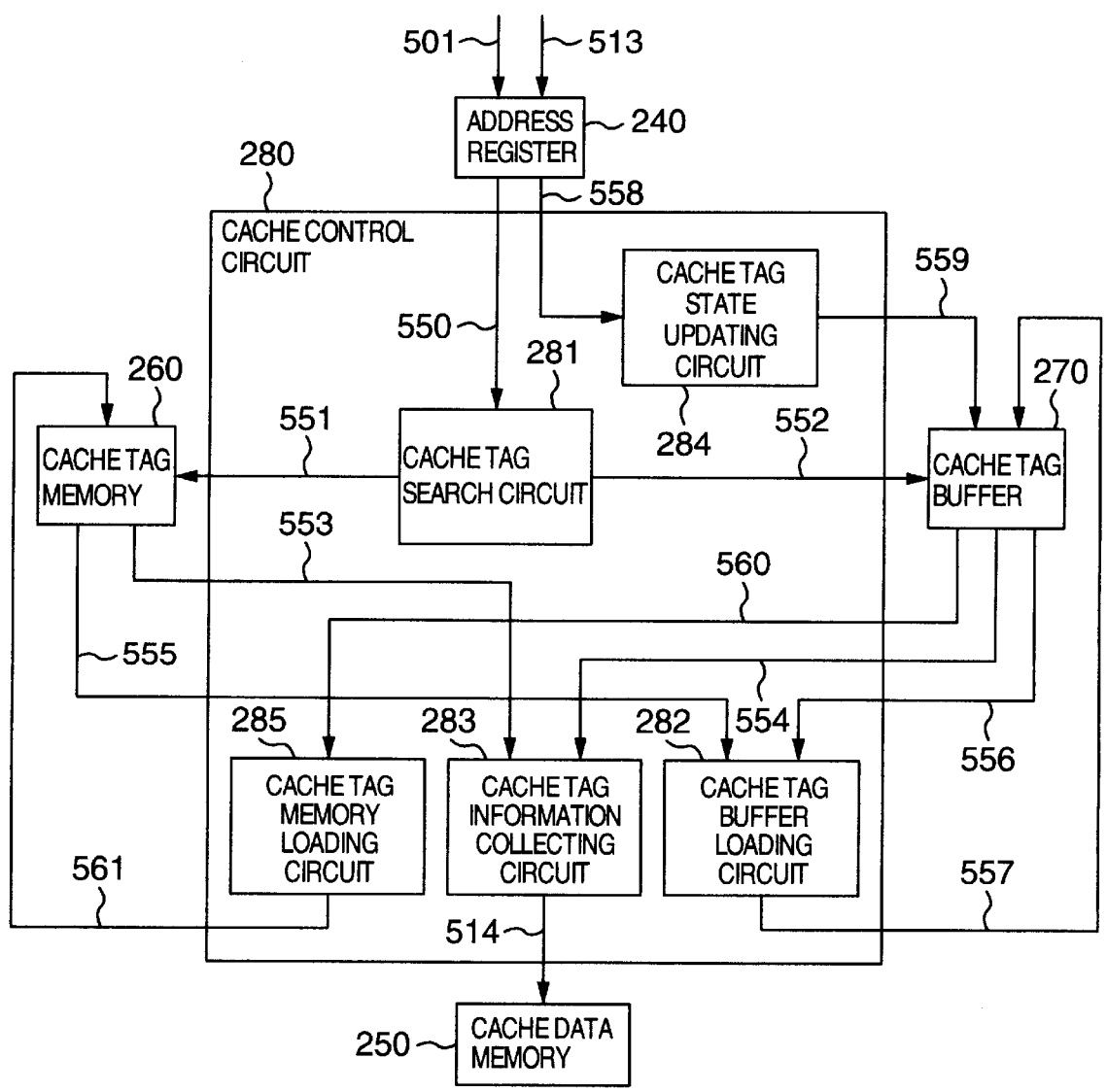
FIG. 3 shows a detailed configuration of a cache control circuit in FIG. 1.

FIG. 3 shows a configuration example of the cache control circuit 280. In FIG. 3, like components as in FIG. 1 are denoted by like reference symbols. The cache control circuit 280 includes: a cache tag search circuit 281 issuing a search request to the cache tag memory 260 and to the cache tag buffer 270; a cache tag buffer loading circuit 282 for writing a set read out from the cache tag memory 260, into the cache tag buffer 270; a cache tag information collecting circuit 283 deciding whether a cache hit has occurred according to the cache block state read out from the cache tag memory 260 and the cache tag buffer 270; a cache tag state updating circuit 284 for updating the cache block state of the cache tag buffer 270; and a cache tag memory loading circuit 285 for writing back the set of the cache tag buffer 270 to the cache tag memory 260.

Hereinafter, referring to FIG. 3, explanation will be given on detailed operation of the cache control circuit 280 for the cache tag memory 260 and the cache tag buffer 270.

When an address of a transaction address issued from the processor 10 or a coherency address of a transaction issued from the other cache system 21 is set in the address register 240 via the path 501 or the path 513, the cache tag search circuit 281 receives the request address or the coherence address via a path 550, issues a cache tag search request to the cache tag memory 260 via a path 551, and simultaneously with this, issues a cache tag search request to the cache tag buffer 270 via a path 552. Hereinafter, explanation will be given on an operation case when a transaction request address issued from processor 10 is received but the operation performed upon reception of a transaction coherency address issued from the other cache system 21 is basically identical to this.

The cache tag search request reads out via a path 553, information of a cache block corresponding to the request address from the cache tag memory and reads out via a path 554, information of a cache block corresponding to the request address from the cache tag buffer, and transmits the information to the cache tag information collecting circuit 283. The latency required for this read-out is shorter in the cache tag buffer 270 composed of a storage device having a higher speed than the cache tag memory 260.

Upon reception of the cache block information from the cache tag buffer 270, the cache tag information collecting circuit 283 decides that the latest cache block information is present in the cache tag buffer and uses the cache block information to decide whether a cache hit has bee caused. On the other hand, when no cache block information is received from the cache tag buffer 270, the cache tag information collecting circuit 283 waits until the cache block information from the cache tag memory 260 is read out. Upon reception of the cache block information from the cache tag memory 260, the cache hit decision is made according to this information. However, if the cache block information was not read out from the cache tag memory 260, either, it is decided that cache miss occurred. After deciding the cache block state, the cache tag information collecting circuit 283 reports the cache hit decision result via the path 514 to the cache data memory 250.

In the same as the processing in the cache tag information collecting circuit 283, the cache tag buffer loading circuit 282 receives the read-out cache block information from the cache tag memory 260 via a path 555 and from the cache tag buffer 270 via a path 556. Here, the cache tag buffer loading circuit 282 receives all the cache block information items in the set having the corresponding cache block. Upon reception of the cache block information from the cache tag memory 260 and the cache tag buffer 270, the cache tag buffer loading circuit 282 decides whether updating processing should be performed to the cache tag buffer 270.

The updating decision is made according to a combination of the following two conditions. Condition 1 is whether the cache tag buffer 270 has a set corresponding to the request address and condition 2 is whether the cache tag buffer 270 or the cache tag memory 260 has information of the cache block corresponding to the request address.

Firstly, if the cache tag buffer 270 has the set and if the cache block information is present, then the cache tag buffer loading circuit 282 does not perform updating processing and uses cache block information currently loaded in the cache tag buffer 270 for the transaction processing. Here, if the cache block has its lock bit as "0", it is turned to "1". Next, if the cache tag buffer 270 has the set but no cache block information is present, then the lock bit in the set is checked. If a cache block having lock bit "0" is present in the set, then the cache block information corresponding to the request address is written into the cache block having the lock bit "0" in the set. Here, if the state of the cache block present in the location of writing is other than "I", this cache block is written back to the main memory 30. If all the lock bits in the set are "1", an arbitrary cache block in the set in the cache tag buffer 270 is selected and if the state of this cache block is other than "I", then write back is performed to the main memory 30 and the cache block information corresponding to the request address is newly written via a path 557 to a position of the cache block selected in the set. Here, the lock bit for this cache block is turned to "1". If the cache tag buffer 270 has no set and if the cache tag memory 260 has the tag information, then the set read out from the cache tag memory 260 is written via a path 557 to the cache tag buffer 270. Here, the lock bit for this cache block is turned to "1". Lastly, if the cache tag buffer 270 has no set and if the cache tag memory 260 has no tag information, then an arbitrary cache block in the read-out set from the cache tag memory 260 is selected. If the state of the cache block is other than "I", write back is performed to the main memory 30 and the tag information corresponding to the position of the selected cache block in the set is newly written to the cache tag buffer 270 via the path 557. Here, the lock bit for this cache block is turned to "1".

In case an update request of corresponding tag information is received while a transaction processing is being performed, the cache tag state updating circuit 284 updates the cache tag buffer 270. More specifically, the cache tag state updating circuit 284 receives an address indicating the cache block to be updated, from the address register 240 via a path 558, and updates the state of the cache block in the cache tag buffer 270 via a path 559. Moreover, a dirty bit in the cache block is turned to "1".

The cache tag memory loading circuit 285 is monitoring all the time the dirty bit and the lock bin in the respective sets of the cache tag buffer 270 and writes buck the sets to the cache tag memory 260 via a path 561 when a transaction processing using all the cache blocks in an arbitrary set in the computer system is completed, i.e., all the lock bits are "0" and at one of the dirty bits in the set is "1". This processing is performed in parallel with the transaction processing in the system, not affecting the data processing throughput of the computer system. Moreover, the cache tag buffer 270 is characterized in that the dirty bit is used to reduce an unnecessary access from the cache tag buffer 270 to the cache tag memory 260. More specifically, a dirty bit is set upon updating the cache tag memory state, thereby indicating that the cache state of a set has been updated. This enables to decide whether the cache state of the set is updated and write is performed to the cache tag memory 260 by writing only sets different having states different from the state of the aforementioned set of the cache tag memory 260.

As has been described above, according to the present embodiment, an access to a cache tag of a transaction processing in a computer system can be realized by accessing a CPU or a cache tag buffer in a chip set. This brings about a significant effect. In contrast to the conventional technique disclosed in JP-A-9-293060 for example in which upon a cache hit, two accesses are required to the cache tag memory, according to the present embodiment, only one access is required or no access is required if a set containing the cache block to be processed is already stored in the cache tag buffer 270. Moreover, in the conventional technique, four accesses should be made to the cache memory upon a cache miss, but the present embodiment requires no access or only two access at the most.

What is claimed is:

1. A cache system comprising:
   a cache data memory for storing a part of data stored in a main memory;
   a cache tag memory for storing information indicating a position in the main memory of each data which the cache data memory stores;
   a cache tag buffer for storing information indicating a position in the main memory of a part of data which the cache data memory stores, and
   cache controller that controls an access to the cache data memory;
   wherein the cache controller refers the cache tag memory and the cache tag buffer when the cache controller receives a memory access request from a processor and uses information of the cache tag buffer to control an access to the cache data memory when an information of a target cache data of the memory access request is stored in the cache tag buffer.

2. A cache system according to claim 1, further comprising a first LSI, the first LSI comprising the cache controller and the cache tag buffer.

3. A cache system according to claim 2, further comprising a second LSI, the second LSI comprising the cache tag memory.

4. A cache system according to claim 1, wherein the cache tag buffer further stores a dirty bit, and wherein the cache controller sets the dirty bit after the cache controller accesses the cache data memory with the information of the cache tag buffer.

5. A cache system according to claim 4, wherein the cache controller updates the cache tag memory according to the dirty bit.

6. A cache system according to claim 1, wherein the cache controller waits for the reply of the cache tag memory when the cache tag buffer does not store an information of a target cache data of the memory access request.

7. A cache system according to claim 1, wherein when the cache data memory stores a new data received from the main memory or another cache system, the cache tag memory and the cache tag buffer stores an information indicating a position in the main memory of the new data.

8. A cache system comprising:

a cache memory divided into a plurality of sets;

a cache tag memory divided into a plurality of sets, each said set corresponding to the sets of the cache memory and stores a tag of a cache data stored in the corresponding set of the cache memory;

a cache tag buffer divided into a plurality of sets, each of set corresponding to at least a part of the sets of the cache memory and stores a tag of a cache data stored in the corresponding set of the cache memory;

a cache controller which accesses the cache memory with a tag of the cache tag buffer prior to the cache tag memory when the cache tag buffer stores information of a cache data of a memory access request.

9. A cache system according to claim 8, wherein the cache tag buffer comprising a same number of sets as the cache tag memory.

10. A cache system according to claim 8, further comprising a first LSI, the first LSI comprising the cache controller and the cache tag buffer.

11. A cache system according to claim 10, further comprising a second LSI, the second LSI comprising the cache tag memory.

12. A cache system according to claim 8, wherein the cache tag buffer further stores a dirty bit, and wherein the cache controller sets the dirty bit after the cache controller accesses the cache data memory with the information of the cache tag buffer.

13. A cache system according to claim 12, wherein the cache controller updates the cache tag memory according to the dirty bit.

14. A cache system according to claim 8, wherein the cache controller waits for the reply of the cache tag memory when the cache tag buffer does not store an information of a target cache data of the memory access request.

15. A cache system according to claim 8, wherein when the cache data memory stores a new data received from the main memory or another cache system, the cache tag memory and the cache tag buffer stores an information indicating a position in the main memory of the new data.

16. A cache system comprising:

a cache memory comprising a plurality of blocks each of which stores a cache data;

a cache tag buffer to store each tag of cache data stored in a plurality of first blocks;

a cache tag memory to store each tag of cache data stored in a plurality of second blocks, at least some of the plurality of second blocks being common to the plurality of first blocks;

a cache controller which accesses the cache memory with a tag stored in the cache tag memory or in the cache tag buffer, the cache controller to prioritize an access with a tag stored in the cache tag memory when one of the second blocks is to be accessed.

17. A cache system according to claim 16, wherein the cache tag buffer comprising a same number of sets as the cache tag memory.

18. A cache system according to claim 16, further comprising a first LSI, the first LSI comprising the cache controller and the cache tag buffer.

19. A cache system according to claim 18, further comprising a second LSI, the second LSI comprising the cache tag memory.

20. A cache system according to claim 16, wherein the cache tag buffer further stores a dirty bit, and wherein the cache controller sets the dirty bit after the cache controller accesses the cache data memory with the information of the cache tag buffer.

21. A cache system according to claim 20, wherein the cache controller updates the cache tag memory according to the dirty bit.

22. A cache system according to claim 16, wherein the cache controller waits for the reply of the cache tag memory when the cache tag buffer does not store an information of a target cache data of the memory access request.

23. A cache system according to claim 16, wherein when the cache data memory stores a new data received from the main memory or another cache system, the cache tag memory and the cache tag buffer stores an information indicating a position in the main memory of the new data.

* * * * *